July 1, 1947.  J. A. POTTER  2,423,114
VOLTAGE REGULATED RECTIFIER CIRCUIT
Filed July 25, 1942
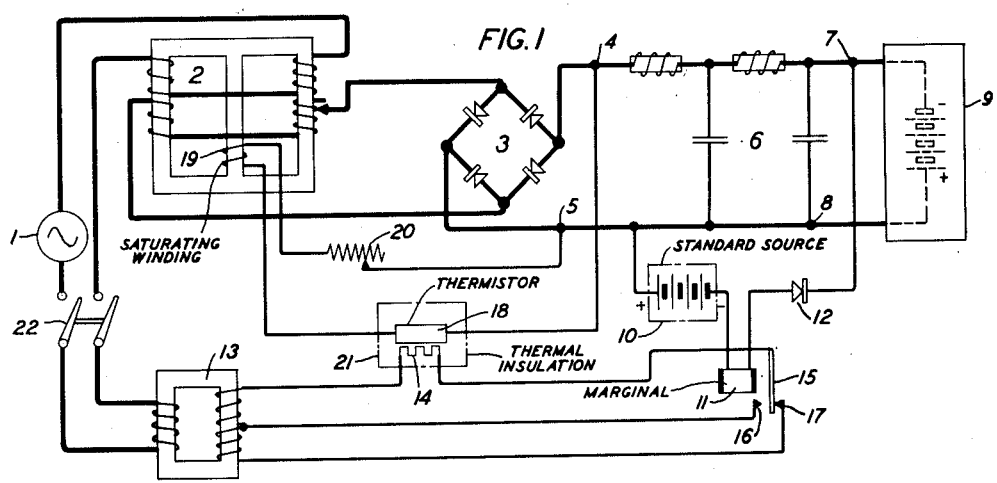
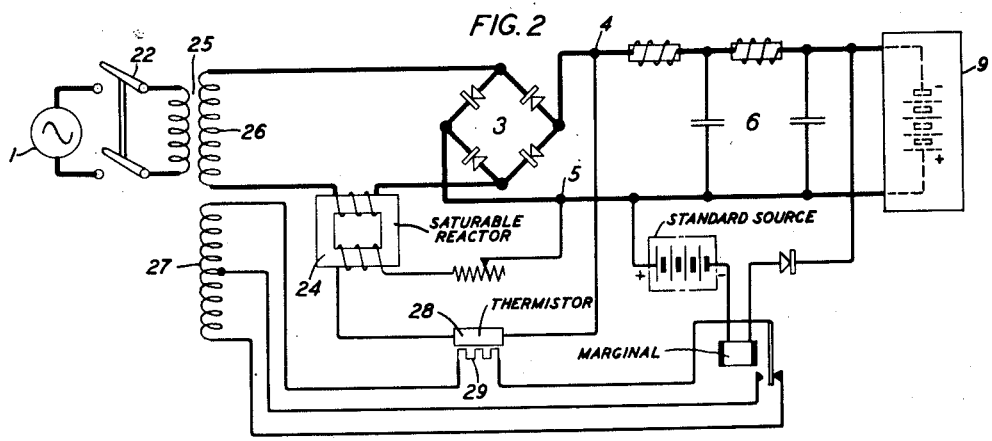
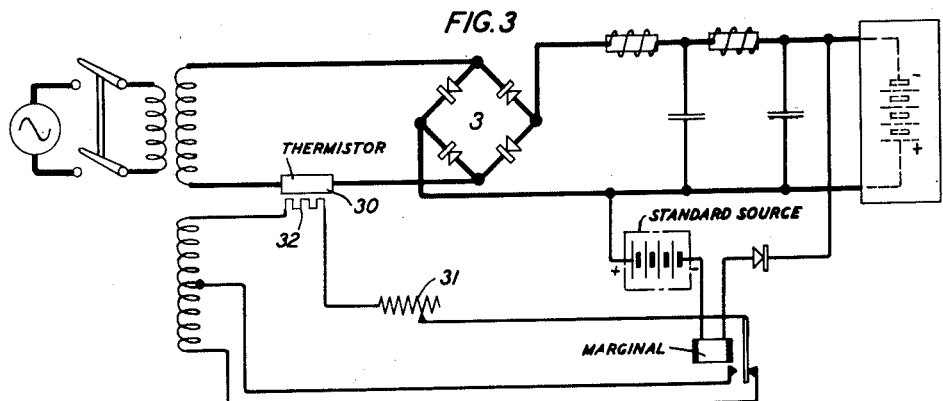
INVENTOR
J. A. POTTER
BY
E. V. Griggs
ATTORNEY

UNITED STATES PATENT OFFICE 2,423,114

VOLTAGE REGULATED RECTIFIER CIRCUIT

James A. Potter, Rutherford, N. J., assignor to Bell Telephone Laboratories, Incorporated, New York, N. Y., a corporation of New York Application July 25, 1942, Serial No. 452,351

5 Claims. (Cl. 175—363)

This invention relates to regulated rectifier circuits and more particularly to circuits for supplying highly constant rectified electromotive forces for floating small low voltage storage batteries.

An object of the invention is to provide an inexpensive and relatively simple regulating system which may serve to supply highly constant rectified potentials.

Another object of the invention is to smooth out fluctuations in the rectified electromotive force yielded by a rectifier under control of a regulator of the intermittent type.

Another object of the invention is to provide an intermittently operating non-polarized relay with means for enabling it to respond in order to increase the load electromotive force when that electromotive force is below a predetermined critical value but to deenergize and reduce the load electromotive force when it is too high.

In accordance with the invention, variations in the electromotive force of a rectified current are measured by a marginal relay which is subjected to the difference potential between the electromotive force to be measured and a constant magnitude opposing standard reference electromotive force. When it energizes the relay changes the connections of a thermistor heater to transfer it from a low heating electromotive force to a high heating electromotive force, in order to change its resistance in an inverse manner, namely, from high resistance to low resistance. The thermistor may be introduced directly into the alternating current supply circuit as a series impeder or it may serve as a variable resistance control in a saturating circuit of a saturable reactor or of a saturable current supply transformer. In each of these arrangements, the thermal inertia of the thermistor serves to largely smooth out the sudden fluctuations which would otherwise result when the intermittently energized marginal relay is energized or deenergized.

Other features and aspects of the invention will be apparent from a consideration of the following detailed description taken in connection with the accompanying drawing in which Fig. 1 represents by schematic diagram the circuit of a voltage regulated rectifying system embodying the invention and in which the voltage regulating element is associated with the current supply transformer;

Fig. 2 shows a modification of the circuit diagram of Fig. 1 in which the voltage regulating element is a series impeder in the alternating current input circuit of the rectifier, and Fig. 3 presents a still different modification in which the thermistor itself is connected in the alternating current input path of the current supply transformer to serve as the regulator.

Referring to Fig. 1, a source 1 of alternating current is connected by a saturable regulating current transformer 2 to the input of a four-arm rectifier 3 preferably of the copper-oxide type. The output terminals 4 and 5 of the rectifier are connected through a smoothing filter 6 to the input terminals 7 and 8 of the load 9, indicated in the drawing as a storage battery, and to which it is desired to supply substantially constant voltage unidirectional current. The voltage regulating apparatus comprises three principal parts of which the first is a voltage measuring path connected across the load input terminals 7 and 8 and including in series a standard reference battery 10 or equivalent source of constant reference electromotive force, an electromagnetic relay 11 of marginal type and a unidirectional current valve 12. The second part is an alternating heating current supply transformer 13 having a secondary winding in series with a thermistor heater 14 and the armature 15 and one of the fixed contacts 16, 17 of the relay 11. The third part is a unidirectional current path connected between the output terminals 4 and 5 of the rectifier and including in series relationship a thermistor 18 associated in heat-receiving relation with the heater 14, a saturating winding 19 connected inductively with the center leg of the core of transformer 2 and a variable resistor 20. The thermistor 18 and its heater 14 are shown enclosed in a container 21 providing thermal insulation surrounding the thermistor unit including its heater to delay the rapidity of cooling the thermistor.

With the apparatus in the idle condition as shown in Fig. 1, the system is set in operation by first closing switch 22 to connect the source 1 to the primary windings of transformers 2 and 13. At this time the thermistor element 18 is cold, its resistance is high and the unidirectional current supplied through the thermistor to the saturating winding 19 is small. Under these conditions the alternating current electromotive force induced in the secondary winding of transformer 2 is low and the corresponding unidirectional electromotive force delivered at the output terminals 4 and 5 of the rectifier 3 is likewise low. The electromotive force of the standard source 10 is preferably somewhat less than that of the desired rectified load voltage. In an actual example, the electromotive force of cell 10 may be 21.7 volts in a regulating system in which the electromotive force to be supplied across the points 7, 8 to the load is to be held between limits of 21.8 and 22.2 volts with a load current of 1 ampere. Assuming that the load 9 does not involve a battery or, if it does, that the voltage of the battery is low, there may be a period during the building up of the rectified voltage across the points 7, 8 in which the electromotive force of the standard source exceeds that applied by the rectifying system across the points 7, 8. This would tend to permit the source 10 to overcome the rectified load voltage supplied to points 7, 8 and to send current through the relay 11. However, the valve 12 is so poled as to prevent such a reverse current through relay 11. The relay therefore remains deenergized and its armature 15 in its released position is in engagement with the contact element 17 thus applying the full voltage of the secondary winding of transformer 13 to the heater 14. Consequently, the temperature of the heater 14 rapidly rises and with it that of thermistor 18. As the temperature of thermistor 18 increases its resistance falls thus permitting the current through the saturating winding 19 to rise and to reduce the effective impedance of current supply transformer 2. Thus it comes about that the alternating input voltage impressed upon the rectifier 3 and the resulting rectified voltage impressed across the points 7, 8 rise until a point is reached at which the rectified voltage exceeds the electromotive force of cell 10. Current then begins to flow through the unidirectional valve 12 and the relay 11. When it reaches the marginal magnitude for which the relay 11 is designed, relay 11 is sufficiently energized to attract armature 15 into engagement with contact 16 thus transferring the heating circuit of heater 14 from the entire secondary winding of transformer 13 to the upper portion only of that winding. This reduces the heat applied to thermistor 18 and permits its resistance to rise with a consequent rise in impedance of the transformer 2. Cooling of the thermistor 18 begins but occurs relatively slowly inasmuch as the heater 14 is still supplying heat but at a rate slightly less than that at which heat is lost by the thermistor. Gradually the alternating electromotive force applied to the rectifier 3 falls and with it the rectified electromotive force across the points 7, 8 until a point is reached at which the reduced current through relay 11 permits the relay to deenergize sufficiently to release armature 15. Thereupon the full electromotive force of the secondary heating transformer 13 is again applied to heater 14 and the heating cycle is completed.

It will be seen that the relay 11 is not traversed by current except during those intervals in which the rectified load electromotive force exceeds the electromotive force of standard cell 10. When the two electromotive forces are equal, there is a zero resultant electromotive force applied to the relay path; during the period in which the load electromotive force exceeds that of the standard cell, the maximum potential difference of the two may be very small, as for example, of the order of .5 volt. Accordingly, relay 11 may be designed as a very sensitive device since the electromotive forces to which it is subjected are of low magnitude. This facilitates the reduction of the magnitude of current at which the relay actuates its armature and the difference between that current and that at which the relay releases its armature.

The intermittently operating apparatus may be set to have such a range of operation as to cause the rectified output voltage to oscillate between its upper and lower limits at a low frequency of the order of tenths of cycles per minute. Although regulation is effected under the primary control of an intermittently actuated armature, the thermal characteristic of the thermistor apparatus smooths out the fluctuations to such an extent that the rectified voltage slowly drifts during each cycle from its lower limit to its upper limit and back to the lower limit. Its action while very positive is therefore smooth and such an apparatus is well suited to the regulation of rectified electromotive forces for loads in which sudden fluctuations are undesirable.

The thermistor acts, as has been explained, as a smoothing element so that in cooperation with the relay 11, it converts the intermittent action of the relay into a slow change in regulation. The thermistor further serves as an amplifying agency to enable small changes of the rectified electromotive force to be reflected as slowly varying impedance in the supply circuit.

The circuit of Fig. 2 differs from that of Fig. 1 in that there is provided a separate saturable reactor 24 in the input circuit of the rectifier 3. The current supply transformer 25 may in this circuit be provided with a main secondary winding 26 to supply current to the rectifier 3 to be rectified and an auxiliary secondary winding 27 to supply heating current to thermistor 28. This eliminates the necessity of the separate transformer 13. Any tendency of the connections through reactor 24 and thermistor 28 to introduce alternating current ripples in the load circuit across the points 4, 5 may be largely eliminated by the smoothing filter 6. It will be understood that in this circuit as in the circuit of Fig. 1, a jacket of thermal insulation may be employed about thermistor 28 and its heater 29. The operation of this circuit will be readily apparent from the description which has already been given of the operation of the system of Fig. 1.

In Fig. 3, the circuit of Fig. 2 is further simplified by elimination of the saturable reactor and use of the thermistor 30 as the series impeder to control the alternating electromotive force supplied to the rectifier. In order to provide for adjustments, a variable resistor 31 is included in the heating circuit of thermistor heater 32.

What is claimed is:

1. Apparatus for varying the effective alternating electromotive force supplied to a rectifier comprising an inductive device having a magnetic core, transformer primary and secondary windings associated with the core, a saturating winding also associated with the core, a rectifier having its input terminals connected to the output terminals of the secondary winding and having an output circuit, a source of standard electromotive force and an intermittently operating relay having an armature and contacts and having its operating winding connected in series across the rectifier output circuit with the standard electromotive force opposing the rectified electromotive force to subject the relay to the difference of the two electromotive forces, a thermistor and a current supply source in series with the saturating winding, and means controlled by the engagement of the relay armature with a contact of the relay to vary the temperature of the thermistor and consequently the current in the saturating winding.

2. A current supply system comprising a transformer having inductively coupled primary and secondary windings, a rectifier connected to the secondary winding through a thermistor impeder, a heater for the impeder, high voltage and low voltage transformer windings inductively connected to the primary winding, a source of standard electromotive force connected in opposing relation to the output of the rectifier, and means in series therewith and responsive to the difference between the potentials of the output circuit and the standard source to alternately connect the high voltage and the low voltage transformer windings to the impeder heater whereby a tendency to excessive increase in the rectifier output circuit potential will be attended by a reduction in the temperature of the thermistor impeder and a tendency to an excessive lowering of the rectifier output potential will cause the temperature of the thermistor impeder to be raised.

3. A current supply system comprising a transformer having a primary winding, a secondary winding in inductive relation thereto, a saturable magnetic core associated with the windings, a saturating winding also inductively associated with the saturable core, means for supplying current to the saturating winding and to a thermistor connecting said means to said saturating winding, a heating element for said thermistor, a rectifier connected to the terminals of the secondary winding, a control path including a source of standard electromotive force and an electromagnetic control relay having a winding connected in series with said source of standard electromotive force across the output terminals of the rectifier, the source of standard electromotive force being so directed as to oppose the output voltage of the rectifier, the control relay having contacts and a movable armature connected in series through said heating element for said thermistor to a means for supplying current to said heating element, whereby in response to the potential difference of the opposing electromotive force and the output voltage across said output terminals the control relay may operate to control the current supplied to the saturating winding.

4. In combination, means for supplying unidirectional current to a load, said means including control means comprising a thermistor for controlling in response to temperature changes of said thermistor the current supplied to said load to thereby control the load voltage, an electric heater element for heating said thermistor to control its temperature when current is supplied to said heater element, means comprising a marginal electromagnetic relay having an armature and contacts for controlling the supply of current from a source through said armature and contacts to said heater element, said relay having an operating winding, and means for controlling the energization of said relay winding to control the operation of said relay and thereby to control the current supplied to said heater element, said means comprising a source of electromotive force and a circuit connecting said source of electromotive force and said relay winding in series across said load, the electromotive force of said source of electromotive force and the voltage across said load being in opposition with respect to each other in said circuit.

5. In combination, means for supplying unidirectional current to a load, said means comprising control means under control of a control current supplied thereto for controlling the current supplied to said load to thereby control the load voltage, means comprising an electromagnetic relay having an armature and contacts for controlling the supply of control current from a source through said armature and contacts to said control means, said relay having an operating winding, and a current path connected across said load including in series a source of counter-electromotive force, said operating winding and a unidirectional current valve, the relay being marginal, whereby the relay operates and releases in response to the different voltage of the load voltage and the electromotive force of said source of counter-electromotive force only when said difference voltage has such a polarity as to cause current to flow through said unidirectional current valve.

JAMES A. POTTER.

REFERENCES CITED

The following references are of record in the file of this patent:

UNITED STATES PATENTS

| Number | Name | Date |
|---|---|---|
| 1,196,618 | Turbayne | Aug. 29, 1916 |
| 1,457,851 | Nesbit | June 5, 1923 |
| 2,000,189 | Power | May 7, 1935 |
| 2,018,348 | Dijksterhuis | Oct. 22, 1935 |
| 2,079,500 | Foos | May 4, 1937 |
| 2,331,131 | Moyer | Oct. 5, 1943 |
| 1,298,443 | Bodde | Mar. 25, 1919 |
| 353,179 | Thomson | Nov. 23, 1886 |
| 1,909,104 | Gulliksen | May 16, 1933 |